United States Patent
Castro et al.

(10) Patent No.: US 10,163,015 B2
(45) Date of Patent: Dec. 25, 2018

(54) DETECTING FOLIAGE USING RANGE DATA

(71) Applicant: Ford Global Technologies, LLC, Dearborn, MI (US)

(72) Inventors: Marcos Paul Gerardo Castro, Mountain View, CA (US); Sneha Kadetotad, Cupertino, CA (US); Dongran Liu, San Jose, CA (US); Jinesh J. Jain, Palo Alto, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/353,640

(22) Filed: Nov. 16, 2016

(65) Prior Publication Data

US 2018/0137374 A1    May 17, 2018

(51) Int. Cl.
*G06K 9/00* (2006.01)
*G06K 9/46* (2006.01)
*G06T 7/00* (2017.01)
*G05D 1/02* (2006.01)

(52) U.S. Cl.
CPC ....... *G06K 9/00805* (2013.01); *G05D 1/0246* (2013.01); *G06K 9/46* (2013.01); *G06T 7/0022* (2013.01); *G06T 7/0042* (2013.01); *G06T 2207/30252* (2013.01)

(58) Field of Classification Search
CPC ...... G06K 9/00805; G06K 9/209; G06K 9/46; G06K 9/6267; G05D 1/0246; G06T 7/0022; G06T 7/0042
See application file for complete search history.

(56) References Cited

U.S. PATENT DOCUMENTS

| | | | |
|---|---|---|---|
| 7,295,925 B2 | 11/2007 | Breed | |
| 8,195,342 B2 | 6/2012 | Anderson | |
| 8,577,538 B2 | 11/2013 | Yamauchi | |
| 8,912,946 B2 | 12/2014 | Yanagihara | |
| 9,229,102 B1* | 1/2016 | Wright | G01S 13/888 |
| 9,349,057 B2 | 5/2016 | Tsuchiya | |
| 9,846,433 B2* | 12/2017 | Tanaka | G05D 1/0221 |
| 2006/0115115 A1* | 6/2006 | Nagaoka | G06K 9/00362 382/103 |
| 2006/0257017 A1* | 11/2006 | Luo | G06K 9/0061 382/159 |
| 2010/0013615 A1 | 1/2010 | Hebert | |

(Continued)

FOREIGN PATENT DOCUMENTS

WO    WO-201519356 A1    2/2015

*Primary Examiner* — Mekonen Bekele
(74) *Attorney, Agent, or Firm* — David R. Stevens; Stevens Law Group (57) ABSTRACT

A system for detecting and identifying foliage includes a tracking component, a tracking parameters component, and a classification component. The tracking component is configured to detect and track one or more features within range data from one or more sensors. The tracking parameters component is configured to determine tracking parameters for each of the one or more features. The tracking parameters include a tracking age and one or more of a detection consistency and a position variability. The classification component is configured to classify a feature of the one or more features as corresponding to foliage based on the tracking parameters.

17 Claims, 6 Drawing Sheets

(56) References Cited

U.S. PATENT DOCUMENTS

| | | | |
|---|---|---|---|
| 2011/0262009 A1* | 10/2011 | Duan | G06K 9/00805 |
| | | | 382/103 |
| 2012/0044372 A1* | 2/2012 | Cote | H04N 5/23245 |
| | | | 348/218.1 |
| 2012/0154200 A1* | 6/2012 | Kajiki | G01S 7/4017 |
| | | | 342/70 |
| 2014/0168440 A1 | 6/2014 | Tsuchiya | |
| 2015/0045988 A1* | 2/2015 | Gusikhin | B60R 16/037 |
| | | | 701/2 |
| 2015/0169959 A1* | 6/2015 | Choi | B60T 7/22 |
| | | | 701/70 |
| 2016/0082840 A1* | 3/2016 | Yoshida | B60K 35/00 |
| | | | 701/36 |
| 2016/0297430 A1 | 10/2016 | Jones | |
| 2018/0173237 A1* | 6/2018 | Reiley | G05D 1/0214 |

\* cited by examiner

DETECTING FOLIAGE USING RANGE DATA

TECHNICAL FIELD

The present disclosure relates to detecting foliage and more particularly relates to detecting foliage using range data.

BACKGROUND

Automobiles provide a significant portion of transportation for commercial, government, and private entities. Autonomous vehicles and driving assistance systems are currently being developed and deployed to provide safety features, reduce an amount of user input required, or even eliminate user involvement entirely. For example, some driving assistance systems, such as crash avoidance systems, may monitor driving, positions, and a velocity of the vehicle and other objects while a human is driving. When the system detects that a crash or impact is imminent the crash avoidance system may intervene and apply a brake, steer the vehicle, or perform other avoidance or safety maneuvers. As another example, autonomous vehicles may drive, navigate, and/or park a vehicle with little or no user input. Because obstacle avoidance is a key part of automated or assisted driving, it is important to correctly detect and classify detected objects or surfaces.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings where.

DETAILED DESCRIPTION

Active and passive vehicle safety features may rely heavily on sensors (ultrasonic, camera, radar etc.) to accurately detect, classify and track objects in the environment. Active vehicle features like emergency brake assist, forward collision assist, or the like aim to brake to avoid solid objects (e.g., walls, poles, pedestrians, cars) which would potentially cause casualties.

Data association and tracking methodologies may be used techniques to detect and estimate the trajectory of potential obstacles. Range-based sensors (e.g. ultrasonic, LIDAR, radar, or other sensors), provide detections including coordinates (e.g., 2-dimensional x, y coordinates) and velocities for obstacles or features in their field of view. This information may be used by a tracking technique to identify and track objects in a vehicular environment. Tracking techniques may detect objects or features in a frame and create tracklets corresponding to each object or feature. The term "tracklet" as used herein is given to mean a data object used to track an object or feature within sensor data.

However, Applicants have recognized that foliage, such as open grounds with grass, small bushes, overhanging branches, or the like, are not necessarily dangers to a moving vehicle, but may be detected as solid objects by range-based sensors like ultrasonic, light detection and ranging (LIDAR), or radar sensors. Thus, a valid tracklet may be formed for foliage as well as solid objects. These detections can potentially cause a lot of false alarms by active vehicle safety features and inconvenience by passive vehicle safety features repeatedly alerting the driver. Applicants have recognized that an ability to discriminate foliage in these scenarios would be helpful for ensuring a comfortable and save experience to a user of the vehicle.

Applicants have developed and disclose herein systems, methods and devices to distinguish foliage objects from other solid objects in range data. According to one embodiment, a system for detecting and identifying foliage includes a tracking component, a tracking parameters component, and a classification component. The tracking component is configured to detect and track one or more features within range data from one or more sensors. The tracking parameters component is configured to determine tracking parameters for each of the one or more features. The tracking parameters include a tracking age and one or more of a detection consistency and a position variability. The classification component is configured to classify a feature of the one or more features as corresponding to foliage based on the tracking parameters.

Data obtained from range sensors or (or other sensor data) along with the methods, algorithms, systems, and devices discussed herein allow for the study of three aspects of a tracklet, namely age, consistency, and variability. The age of a tracklet is an indication of how long a valid object has been detected by the tracking algorithm. The consistency of a tracklet includes an indication of how consistent the sensor data is for an object being tracked over time. The variability of a tracklet may include an indication of a standard deviation of position of detections for an object over time and/or a variability of an orientation of data points in or of the tracklet contributing to an object over time.

When compared with solid objects, such as a wall, foliage has a unique signature in age, consistency, and variability. For age, range sensors or range data may detect different parts (leaves, branches, etc.) of foliage through time and hence form multiple tracklets. These tracklets do not get consistent data over time, and hence tend to disappear sooner than those of a solid object. This typically causes foliage based tracklets to have a lower age than those of a solid object. For consistency, a solid object has more readings associated with it through time when compared to foliage. For variability, range sensors or range data detect different parts (leaves, branches etc.) of foliage through time and the detections provided to the tracklet may have a larger standard deviation in position as well as orientation compared to a solid, static object. This unique signature of foliage can be utilized to distinguish it from other solid objects. This can then be leveraged in making a more calculated decision with respect to braking or other driving maneuvers or decisions.

Further embodiments and examples will be discussed in relation to the figures below.

Figure 1:
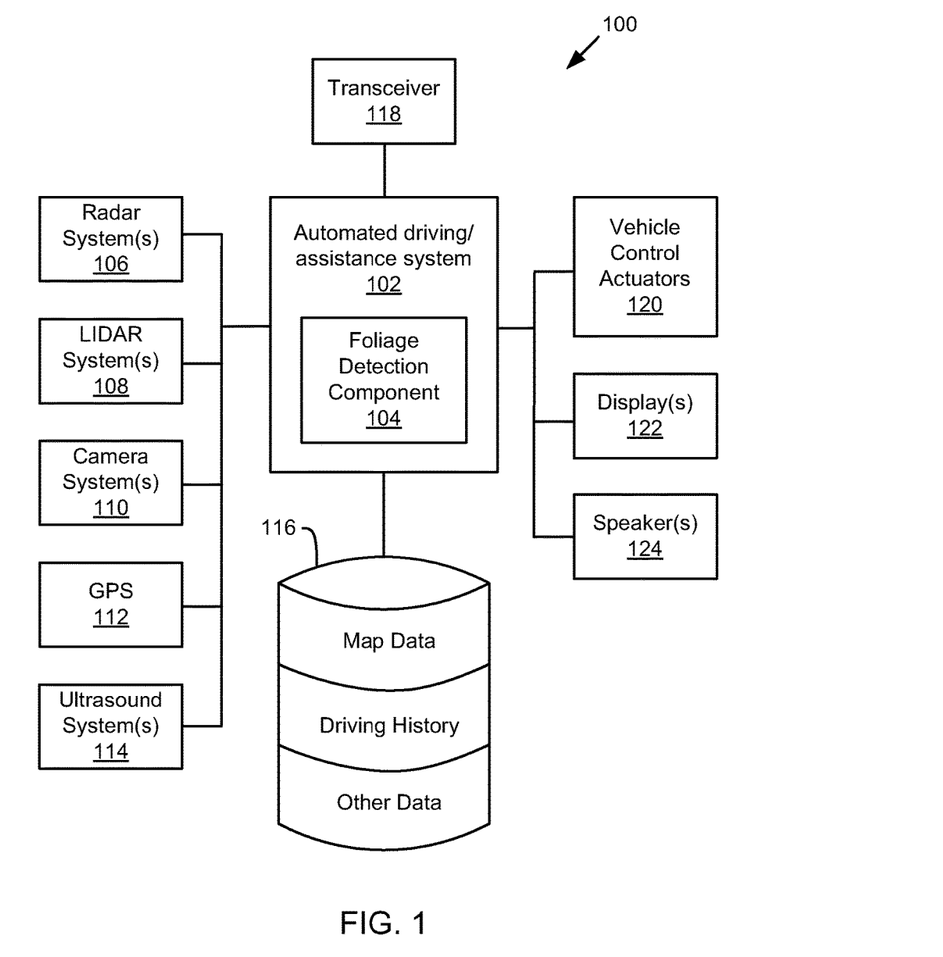
FIG. 1 is a schematic block diagram illustrating an implementation of a vehicle control system that includes an automated driving/assistance system, according to one embodiment.

Referring now to the figures, FIG. 1 illustrates an example vehicle control system 100. The vehicle control system 100 includes an automated driving/assistance system 102. The automated driving/assistance system 102 may be used to automate or control operation of a vehicle or to provide assistance to a human driver. For example, the automated driving/assistance system 102 may control one or more of braking, steering, acceleration, lights, alerts, driver notifications, radio, suspension damping, or any other driving or auxiliary systems of the vehicle. In another example, the automated driving/assistance system 102 may not be able to provide any control of the driving (e.g., steering, acceleration, or braking), but may provide notifications and alerts to assist a human driver in driving safely. For example, the automated driving/assistance system 102 may include one or more controllers (such as those discussed herein) that provide or receive data over a controller bus and use the data to determine actions to be performed and/or provide instructions or signals to initiate those actions.

The vehicle control system 100 also includes one or more sensor systems/devices for detecting a presence of nearby objects, lane markers, bumps, road texture, and/or or determining a location of a parent vehicle (e.g., a vehicle that includes the vehicle control system 100). For example, the vehicle control system 100 may include radar systems 106, one or more LIDAR systems 108, one or more camera systems 110, a global positioning system (GPS) 112, and/or ultrasound systems 114. The vehicle control system 100 may include a data store 116 for storing relevant or useful data such as vehicle information (model information or vehicle performance characteristics), map data, driving history (i.e., drive history), or other data. The vehicle control system 100 may also include a transceiver 118 for wireless communication with a mobile or wireless network, other vehicles, infrastructure, cloud or remote computing or storage resources, or any other communication system.

The vehicle control system 100 may include vehicle control actuators 120 to control various aspects of the driving of the vehicle such as electric motors, switches or other actuators, to control braking, acceleration, steering, suspension, or the like. The vehicle control system 100 may include one or more displays 122, speakers 124, or other devices so that notifications to a human driver or passenger may be provided. A display 122 may include a heads-up display, dashboard display or indicator, a display screen, or any other visual indicator, which may be seen by a driver or passenger of a vehicle. The speakers 124 may include one or more speakers of a sound system of a vehicle or may include a speaker dedicated to driver notification. The vehicle control actuators 120, displays 122, speakers 124, or other parts of the vehicle control system 100 may be controlled by one or more of the controllers of the automated driving/assistance system 102.

In one embodiment, the automated driving/assistance system 102 only provides assistance and vehicle control during driving by a human driver. In one embodiment, the automated driving/assistance system 102 is configured to control driving or navigation of a parent vehicle. For example, the automated driving/assistance system 102 may control the vehicle control actuators 120 to drive a path within lanes on a road, parking lot, driveway or other location. For example, the automated driving/assistance system 102 may determine a path based on information or perception data provided by any of the components 106-118. The sensor systems/devices 106-110 and 114 may be used to obtain real-time sensor data so that the automated driving/assistance system 102 can assist a driver or drive a vehicle in real-time. In one embodiment, the automated driving/assistance system 102 also uses information stored in a driving history (locally or remotely) for determining conditions in a current environment. The automated driving/assistance system 102 may implement one or more algorithms, applications, programs, or functionality that drive or assist in driving of the vehicle.

The automated driving/assistance system 102 may include a foliage detection component 104 to detect and/or classify objects as corresponding to foliage. The foliage detection component 104 may classify features, tracklets, or objects as solid objects or foliage to allow the vehicle control system 100 to distinguish between the two. Foliage may include leaves, grass, bushes, and/or branches of sufficient thinness while solid objects may include other objects such as people, other vehicles, curbs, buildings, poles, or the like. For example, the vehicle control system 100 may have a preference for impacting, contacting, or driving through foliage than impacting a solid object. Thus, the vehicle control system 100 may be able to make decisions on what is acceptable, or more acceptable, to impact. In one embodiment, the automated driving/assistance system 102 may intervene to brake for solid objects but may allow a vehicle to impact foliage.

It will be appreciated that the embodiment of FIG. 1 is given by way of example only. Other embodiments may include fewer or additional components without departing from the scope of the disclosure. Additionally, illustrated components may be combined or included within other components without limitation.

Figure 2:
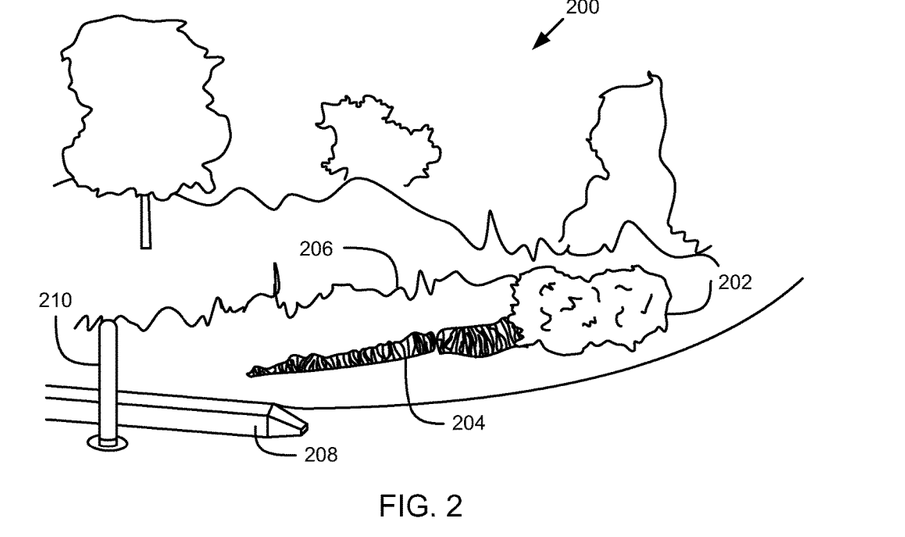
FIG. 2 illustrates a view of foliage in a region near a roadway.

FIG. 2 illustrates a perspective view of a region 200 near a roadway, which may be observed using range data obtained by a vehicle. The region 200 includes a plurality of solid objects and foliage, which may be detected by a sensor of a vehicle. Specifically, the foliage includes bushes 202, grass 204, and other shrubbery 206. In some circumstances, it may be acceptable for a vehicle to contact or drive over the foliage because damage to the vehicle or a person may be less likely. The solid objects illustrated include a curb 208 and a pole 210, which may result in damage or harm to a vehicle, passenger, or the objects themselves.

Range data gathered by a vehicle may generate tracklets for the solid objects 208, 210 as well as for foliage 202, 204, and 206. The tracklets may include one or a plurality of points corresponding to the same object or group of objects. The tracklets may include one point or groups of points in space that have a similar location and/or distance (range) and that tend to move together between frames. The frames may include any type of sensor frame, such as subsequent measurements of LIDAR, radar, camera, or ultrasound data. For example, a tracklet may be generated for a point on the pole 210. Alternatively, a plurality of points on the pole 210 may be grouped together to form a single tracklet. The tracklet may be tracked between subsequent frames (or measurements) so that the movement of a corresponding object or feature can be monitored.

In one embodiment, the foliage detection component 104 may determine parameters that can be used to distinguish solid objects from foliage. For example, the foliage detection component 104 may determine one or more of an age, a consistency, or a variability for each of a plurality of tracklets. Based on these parameters, the foliage detection component 104 may classify a tracklet, or a corresponding object, as foliage or a solid object. Locations corresponding to tracklets of solid objects may be avoided during driving while locations corresponding to tracklets of foliage may be permitted for driving. In one embodiment, foliage may be avoided with a lower priority than solid objects. For example, the automated driving/assistance system 102 may, if required to, choose between impacting a solid object and foliage, and the automated driving/assistance system 102 may choose to impact or drive over the foliage instead of impacting the solid object. Similarly, driving assistance features may provide notifications for the presence of foliage (or ignore foliage), but provide warning or a different type of notification for the presence of solid objects. For example, grass growing between ruts or tire tracks on a dirt road should not cause braking or alarms. Similarly, if an accident is imminent an automated driving/assistance system 102 may be less restrictive on impacting bushes or shrubbery than pedestrians, other vehicles, or objects, for example. It should be noted that tree trunks, large branches, or the like may be identified as solid objects along with the pole 210 and/or curb 208 so that those types of objects may be avoided.

Figure 3:
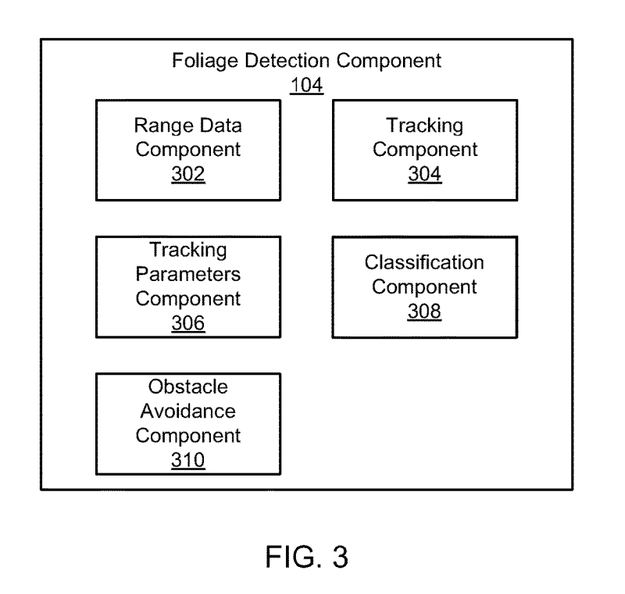
FIG. 3 is a schematic block diagram illustrating example components of foliage detection component, according to one implementation.

Turning to FIG. 3, a schematic block diagram illustrating components of a foliage detection component 104, according to one embodiment, is shown. The foliage detection component 104 includes a range data component 302, a tracking component 304, a tracking parameters component 306, a classification component 308, and an obstacle avoidance component 310. The components 302-310 are given by way of illustration only and may not all be included in all embodiments. In fact, some embodiments may include only one or any combination of two or more of the components 302-310. For example, some of the components 302-310 may be located outside the foliage detection component 104, such as within the automated driving/assistance system 102.

The range data component 302 is configured to obtain range data for a region near a vehicle. For example, the range data may include data from, or based on data from, one or more sensors of the vehicle or a vehicle control system 100 of the vehicle. In one embodiment, the range data may include data from an ultrasound sensor, radar system, LIDAR system, or the like. In one embodiment, the range data may include range data generated from image data gathered by a camera. For example, camera images may be processed to identify features, detect objects, and determine distances to objects or features. Range data may include any type of data that indicates a distance to points or objects. For example, the range data may include data that indicates a distance between a vehicle or sensor and an object, which may be helpful in determining distances to objects within a field of view of a sensor. LIDAR, for example, obtains a distance to each point within a field of view of a LIDAR sensor. Similarly, camera data may be processed to generate range data for one or more points within a field of view of a camera.

The tracking component 304 is configured to detect and track features or points over time. In one embodiment, the tracking component 304 correlates features or points in a first frame of range data (range data gathered at a first point in time) with features or points in a second frame of range data (range data gathered at a second point in time). By correlating features or points, the tracking component 304 may track the presence or movement of objects over time.

The tracking parameters component 306 is configured to determine tracking parameters for one or more features in the range data. The features may include points or tracklets that are or were tracked by the tracking component 304. For example, the tracking component 304 may generate and store information about a position or location of each feature over time. Based on this data, the tracking parameters component 306 may determine one or more characteristics or parameters about the movement, positions, or other details of the feature. In one embodiment, the tracking parameters component 306 determines one or more of a tracking age, a detection consistency, and a position variability of a feature.

The tracking parameters component 306 may determine parameters indicating an age of a feature. In one embodiment, the tracking parameters component 306 may determine the tracking age for a specific feature by determining how long the specific feature has been tracked or detected. For example, the tracking parameters component 306 may determine that the feature has been tracked for a specific number of frames or a specific amount of time. In one embodiment, the tracking age may be an integer number indicating the number of frames that the feature has been detected or tracked. In another embodiment, the tracking age may be a time period in milliseconds or seconds indicating the first time the feature was detected.

The tracking parameters component 306 may determine parameters indicating a consistency, or how consistently, a feature has been detected and tracked. In one embodiment, the tracking parameters component 306 may determine a detection consistency for a feature indicating how consistently, over a time period, the feature has been detected and/or tracked. In one embodiment, the detection consistency may be a ratio of frames in a time period in which the feature was detected to the total number of frames of range data in the time period. For example, the ratio may be a fraction such as $9/10$, $5/10$ or the like. In one embodiment, the detection consistency is a percent of frames in which the feature was detected in a time period. For example, the tracking parameters component 306 may determine that the tracking component 304 detected the feature in 90%, 50%, or some other percentage of frames in a time period.

The tracking parameters component 306 may determine parameters indicating a variability in where feature is detected. In one embodiment, the tracking parameters component 306 may determine a position variability for a feature indicating how variable the position of the feature is, over a time period. In one embodiment, the position variability may include a standard deviation for a location of a feature. For example, a feature may have a small or large standard deviation in movement between frames. The standard deviation for the object, feature, or tracklet may include a value in distance units (e.g., in inches, centimeters, or the like) for movement of the object, feature, or tracklet relative to a vehicle. An object that moves more or moves more randomly may have a higher standard deviation while an object that does not move, or moves only in a single direction (e.g., approximately linearly with respect to the vehicle) may have a lower standard deviation. In one embodiment, the position variability may include a standard deviation for an orientation of a feature or an object. For example, the standard deviation for orientation may indicate an angle of a surface of an object as determined by two or more features or points on the object. The standard deviation for the object, feature, or tracklet may include an angular value (e.g., in degrees) for rotational movement of the vehicle. A feature, tracklet, or object that is measured and appears to rotate, shake, or twist a lot or in an unpredictable manner may have a higher angular standard deviation while an object that does not appear to rotate, shake, or twist very much may have a lower standard deviation.

Figure 4:
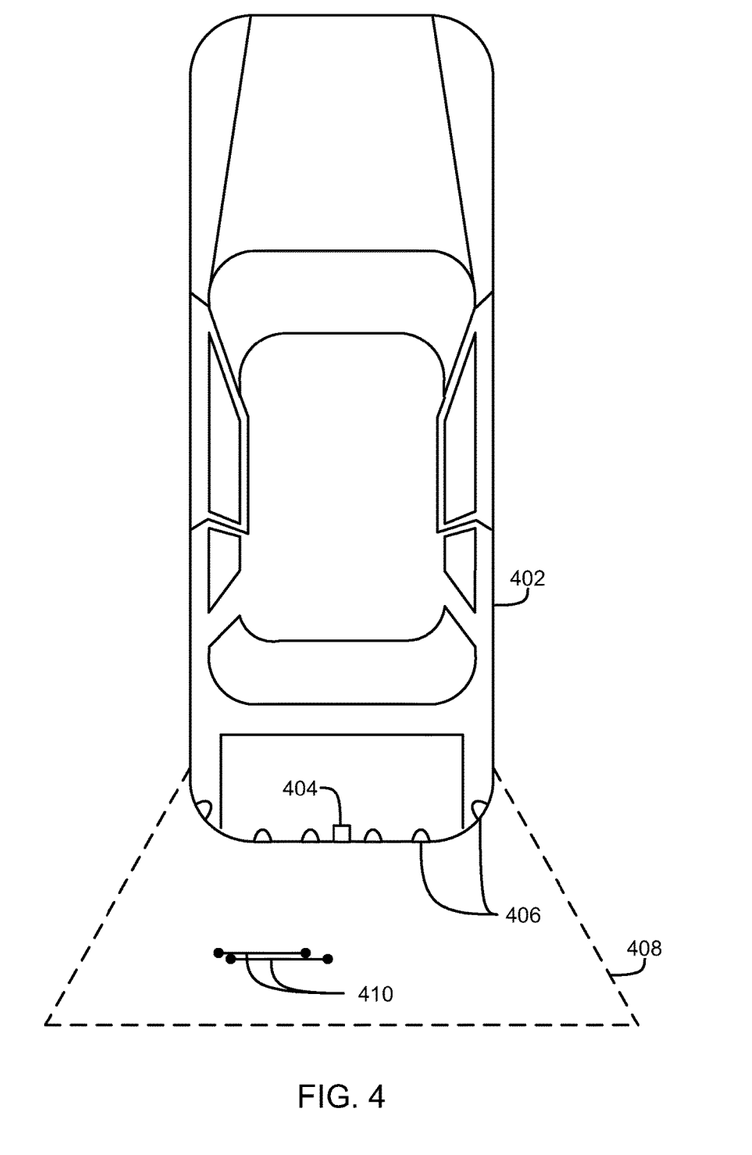
FIG. 4 is a schematic top plan view of a vehicle and detected features of a solid object near the vehicle, according to one implementation.

FIG. 4 is a schematic diagram illustrating detection of a solid object. A vehicle 402 includes a camera 404 and a plurality of ultrasound sensors 406 that observe objects or surfaces in a field of view 408. For example, the camera 404 may include a backup camera and the ultrasound sensors 406 may include sensors that are part of an ultrasound system 114. The ultrasound sensors 406 and/or camera 404 may generate (or be used to generate) range data for objects in the field of view 408. Lines 410 represent positions and orientations of features or tracklets tracked by a tracking component 304 over time. For example, the lines 410 are close together and are parallel, indicating little movement (close together) and/or no rotation (parallel). Thus, the lines 410 show small or little variation in the position and/or angle of the corresponding objects and so may be determined by the tracking parameters component 306 to have a small variation (e.g., standard deviation) in location and/or orientation.

Figure 5:
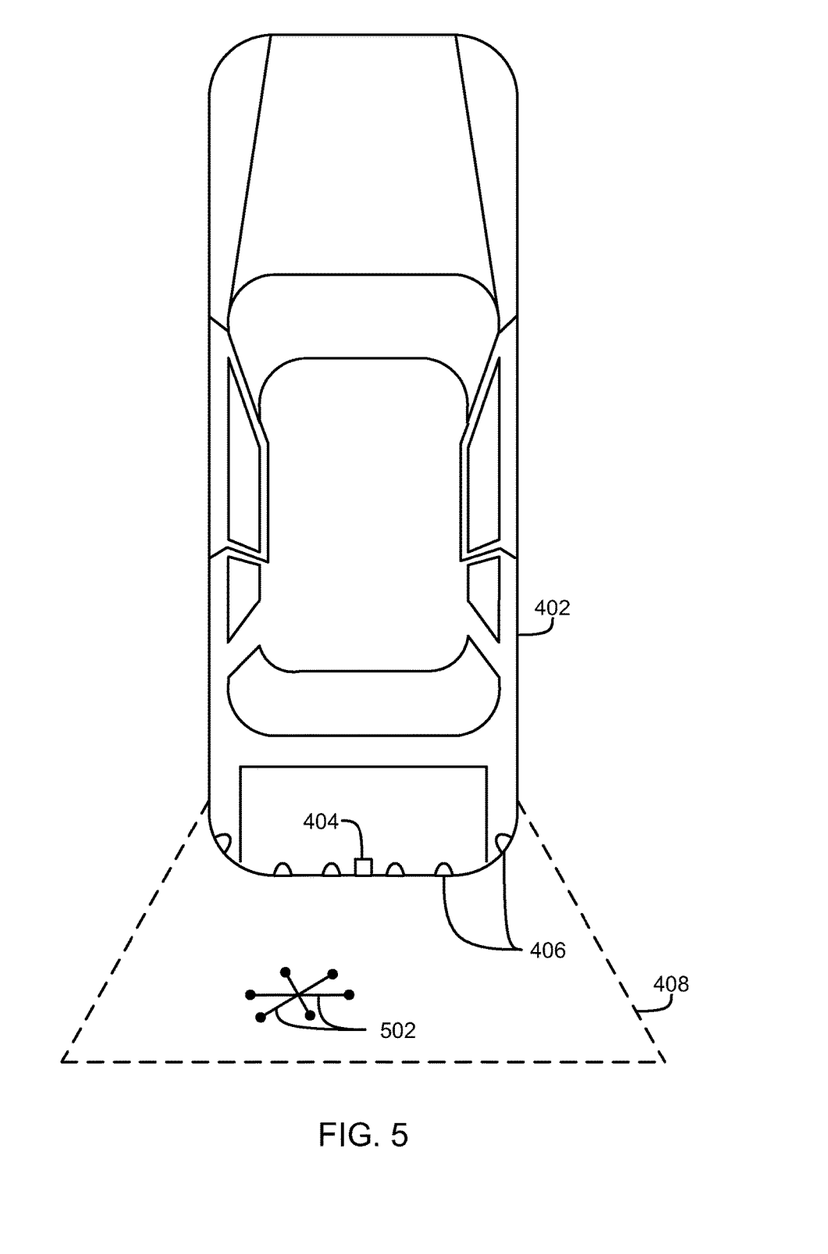
FIG. 5 is a schematic top plan view of a vehicle and detected features of foliage near the vehicle, according to one implementation.

FIG. 5 is a schematic diagram illustrating detection of foliage. Lines 502 represent positions and orientations of features or tracklets tracked by a tracking component 304 over time. For example, the lines 502 are close together, but have very different orientations, indicating perhaps little movement, but a lot of rotation or changes in orientation, at least as detected. Thus, the lines 502 show small or little variation in the position, but show large and random changes in angles or orientation of the corresponding objects over time, and so may be determined by the tracking parameters component 306 to have a large variation (e.g., standard variation) in orientation, but a small variation in location.

Note that although FIGS. 4 and 5 illustrate the use of a camera and ultrasound sensors, other embodiments may include any type of sensor capable of generating or being used to generate range data, such as LIDAR or radar systems.

Returning to FIG. 3, the classification component 308 is configured to classify a feature of the one or more features as corresponding to foliage based on the tracking parameters. For example, the classification component 308 may classify a feature as foliage or a solid object based on values for the age, consistency, and/or variability parameters determined by the tracking parameters component. For example, the classification component 308 may classify an object as foliage if its corresponding features or tracklets have a low age, low consistency, and/or high variability. For example, if the tracking age falls below an age threshold, the detection consistency falls below a consistency threshold, and/or the position variability exceeds a variability threshold, a feature may be identified as foliage. Similarly, if the tracking age exceeds an age threshold, the detection consistency exceeds a consistency threshold, and/or the position variability falls below a variability threshold, a feature may be identified as a solid object. In one embodiment, more complicated combinations of these values may be found to correspond to a solid object or foliage. For example, a neural network, machine learning algorithm, or other algorithm may be used to determine whether a feature or tracklet corresponds to foliage or object to capture more subtile differences in how age, consistency, and/or variability affect classification.

The obstacle avoidance component 310 is configured to determine whether a region or location corresponding to a feature or tracklet should be avoided by an automated or human driver. In one embodiment, the obstacle avoidance component 310 may determine that locations corresponding to solid objects should be avoided (e.g., an obstacle avoidance system should brake if a collision appears likely). In one embodiment, the obstacle avoidance component 310 may determine that locations corresponding to foliage do not need to be avoided, or is to be avoided with a lower priority than solid objects. In one embodiment, the obstacle avoidance component 310 determines whether to avoid impacting an obstacle corresponding to the feature of the one or more features based on the classification of the feature as foliage or a solid object. For example, the obstacle avoidance component 310 may determine a driving maneuver for a vehicle based on the classification of the feature. The driving maneuver may include a maneuver that avoids solid objects, but involves driving through or into foliage.

In one embodiment, the obstacle avoidance component 310 may provide an indication of the locations of foliage, solid objects, or the like to a vehicle control system 100 for decision making or driver notifications. For example, a drive may be notified of a presence of foliage or a solid object. As another example, an automated driving/assistance system 102 may brake if a vehicle approaches too closely to a solid object while allowing the vehicle to come close to and/or even contact foliage without braking.

Figure 6:
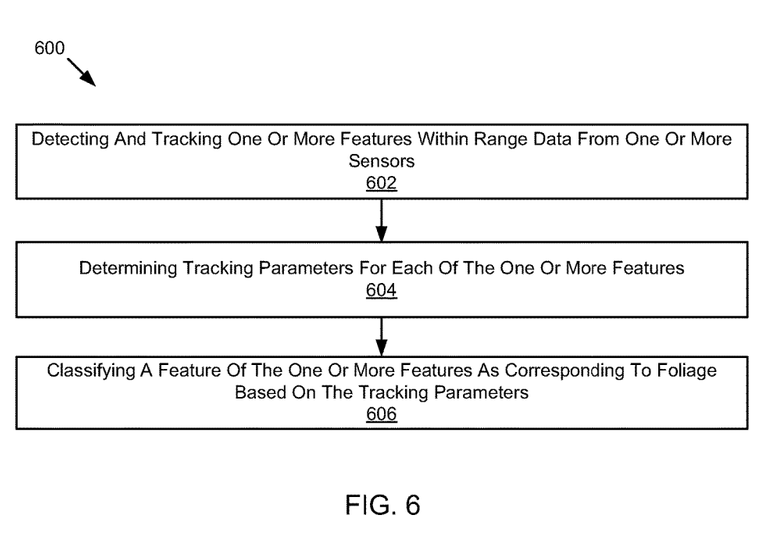
FIG. 6 is a schematic block diagram illustrating a method for detecting foliage, according to one implementation.

FIG. 6 is a schematic flow chart diagram illustrating a method 600 for detecting foliage. The method 600 may be performed by a foliage detection system or vehicle control system, such as the foliage detection system 104 of FIG. 1 or 3 or the vehicle control system 100 of FIG. 1.

The method 600 begins and a tracking component 304 detects and tracks at 602 one or more features within range data from one or more sensors. A tracking parameters component 306 determines at 604 tracking parameters for each of the one or more features. The tracking parameters include a tracking age and one or more of a detection consistency and a position variability. A classification component 308 classifies at 606 a feature of the one or more features as corresponding to foliage based on the tracking parameters. The classification and/or locations of foliage or solid objects may be provided to a control system for avoidance and/or decision making.

Figure 7:
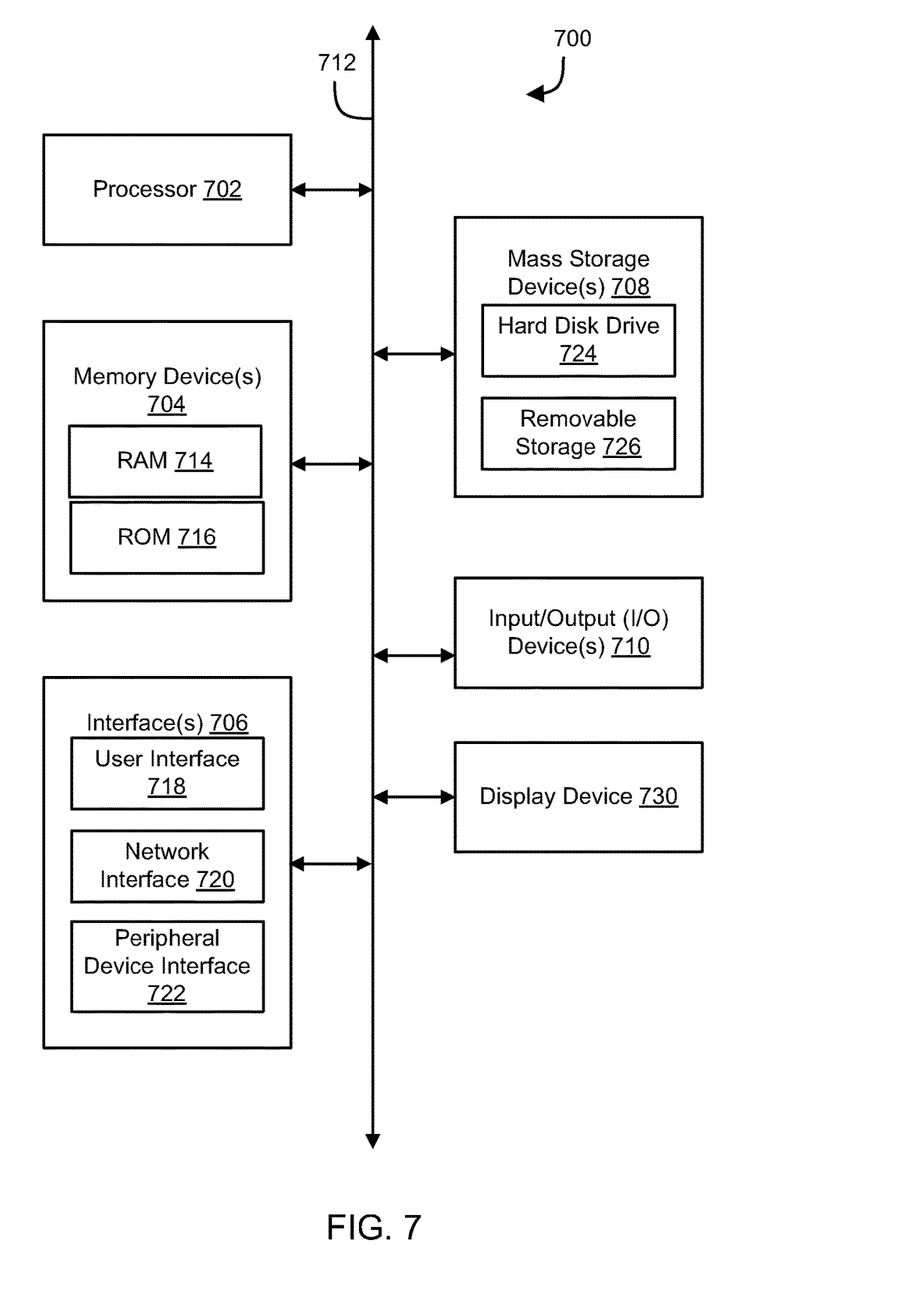
FIG. 7 is a schematic block diagram illustrating a computing system, according to one implementation.

Referring now to FIG. 7, a block diagram of an example computing device 700 is illustrated. Computing device 700 may be used to perform various procedures, such as those discussed herein. Computing device 700 can function as a foliage detection component 104, automated driving/assistance system 102, or the like. Computing device 700 can perform various monitoring functions as discussed herein, and can execute one or more application programs, such as the application programs or functionality described herein. Computing device 700 can be any of a wide variety of computing devices, such as a desktop computer, in-dash computer, vehicle control system, a notebook computer, a server computer, a handheld computer, tablet computer and the like.

Computing device 700 includes one or more processor(s) 702, one or more memory device(s) 704, one or more interface(s) 706, one or more mass storage device(s) 708, one or more Input/Output (I/O) device(s) 710, and a display device 730 all of which are coupled to a bus 712. Processor(s) 702 include one or more processors or controllers that execute instructions stored in memory device(s) 704 and/or mass storage device(s) 708. Processor(s) 702 may also include various types of computer-readable media, such as cache memory.

Memory device(s) 704 include various computer-readable media, such as volatile memory (e.g., random access memory (RAM) 714) and/or nonvolatile memory (e.g., read-only memory (ROM) 716). Memory device(s) 704 may also include rewritable ROM, such as Flash memory.

Mass storage device(s) 708 include various computer readable media, such as magnetic tapes, magnetic disks, optical disks, solid-state memory (e.g., Flash memory), and so forth. As shown in FIG. 7, a particular mass storage device is a hard disk drive 724. Various drives may also be included in mass storage device(s) 708 to enable reading from and/or writing to the various computer readable media. Mass storage device(s) 708 include removable media 726 and/or non-removable media.

I/O device(s) 710 include various devices that allow data and/or other information to be input to or retrieved from computing device 700. Example I/O device(s) 710 include cursor control devices, keyboards, keypads, microphones, monitors or other display devices, speakers, printers, network interface cards, modems, and the like.

Display device 730 includes any type of device capable of displaying information to one or more users of computing device 700. Examples of display device 730 include a monitor, display terminal, video projection device, and the like.

Interface(s) 706 include various interfaces that allow computing device 700 to interact with other systems, devices, or computing environments. Example interface(s) 706 may include any number of different network interfaces 720, such as interfaces to local area networks (LANs), wide area networks (WANs), wireless networks, and the Internet. Other interface(s) include user interface 718 and peripheral device interface 722. The interface(s) 706 may also include one or more user interface elements 718. The interface(s) 706 may also include one or more peripheral interfaces such as interfaces for printers, pointing devices (mice, track pad, or any suitable user interface now known to those of ordinary skill in the field, or later discovered), keyboards, and the like.

Bus 712 allows processor(s) 702, memory device(s) 704, interface(s) 706, mass storage device(s) 708, and I/O device(s) 710 to communicate with one another, as well as other devices or components coupled to bus 712. Bus 712 represents one or more of several types of bus structures, such as a system bus, PCI bus, IEEE bus, USB bus, and so forth.

For purposes of illustration, programs and other executable program components are shown herein as discrete blocks, although it is understood that such programs and components may reside at various times in different storage components of computing device 700, and are executed by processor(s) 702. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

EXAMPLES

The following examples pertain to further embodiments.

Example 1 is a method for detecting foliage. The method includes detecting and tracking one or more features within range data from one or more sensors. The method includes determining tracking parameters for each of the one or more features. The tracking parameters include a tracking age and one or more of detection consistency and position variability. The method includes classifying a feature of the one or more features as corresponding to foliage based on the tracking parameters.

In Example 2, classifying the feature of the one or more features as corresponding to foliage as in Example 1 includes classifying as corresponding to foliage based on one or more of the tracking age falling below an age threshold, the detection consistency falling below a consistency threshold, or the position variability exceeding a variability threshold.

In Example 3, classifying the feature of the one or more features as in any of Examples 1-2 includes classifying a first feature, the method further included classifying a second feature as corresponding to a solid object based on the tracking parameters.

In Example 4, classifying the second feature as corresponding to a solid object as in Example 3 includes classifying as corresponding to a solid object based on one or more of the tracking age exceeding an age threshold, the detection consistency exceeding a consistency threshold, or the position variability falling below a variability threshold.

In Example 5, determining tracking parameters as in any of Examples 1-4 includes determining the tracking age, wherein determining the tracking age for a specific feature comprises determining how long the specific feature has been tracked or detected.

In Example 6, determining tracking parameters as in any of Examples 1-5 includes determining the detection consistency, wherein determining the detection consistency for a specific feature comprises determining a percent or ratio of frames in which the feature has been detected within a time period.

In Example 7, determining tracking parameters as in any of Examples 1-6 includes determining the position variability, wherein determining the position variability for a specific feature comprises determining a standard deviation for one or more of position and orientation of the specific feature.

In Example 8, a method as in any of Examples 1-7 further includes determining whether to avoid impacting an obstacle corresponding to the feature of the one or more features based on the classification of the feature.

In Example 9, a method as in any of Examples 1-8 further includes determining a driving maneuver for a vehicle based on the classification of the feature.

Example 10 is a system that includes a tracking component, a tracking parameters component, and a classification component. The tracking component is configured to detect and track one or more features within range data from one or more sensors. The tracking parameters component is configured to determine tracking parameters for each of the one or more features, the tracking parameters comprising a tracking age and one or more of detection consistency and position variability. The classification component is configured to classify a feature of the one or more features as corresponding to foliage based on the tracking parameters.

In Example 11, the classification component as in Example 10 is configured to classify the feature of the one or more features as corresponding to foliage by determining one or more of: the tracking age falls below an age threshold; the detection consistency falls below a consistency threshold; or the position variability exceeds a variability threshold.

In Example 12, classifying the feature of the one or more features as in any of Examples 10-11 includes classifying a first feature, wherein the classification component is further configured to classify a second feature as corresponding to a solid object based on the tracking parameters.

In Example 13, the classification component as in Example 12 is configured to classify the second feature as corresponding to a solid object based on one or more of: the tracking age exceeding an age threshold; the detection consistency exceeding a consistency threshold; or the position variability falling below a variability threshold.

In Example 14, the tracking parameters component as in any of Examples 10-13 is configured to determine tracking parameters including one or more of: the tracking age, wherein the tracking parameters component is configured to determine the tracking age for a specific feature by determining how long the specific feature has been tracked or detected; the detection consistency, wherein the tracking parameters component is configured to determine the detection consistency for a specific feature by determining a percent or ratio of frames in which the feature has been detected within a time period; or the position variability, wherein the tracking parameters component is configured to determine the position variability for a specific feature by determining a standard deviation for one or more of position and orientation of the specific feature.

In Example 15, the system of claim 10, further comprising an obstacle avoidance component configured to one or more of: determine whether to avoid impacting an obstacle corresponding to the feature of the one or more features based on the classification of the feature; or determine a driving maneuver for a vehicle based on the classification of the feature.

Example 16 is a computer readable storage media storing instructions that, when executed by one or more processors, cause the one or more processors to detect and track one or more features within range data from one or more sensors. The instructions cause the one or more processors to determine tracking parameters for each of the one or more features, the tracking parameters include a tracking age and one or more of a detection consistency and a position variability. The instructions cause the one or more processors to classify a feature of the one or more features as corresponding to foliage based on the tracking parameters.

In Example 17, the instructions cause the one or more processors to classify the feature of the one or more features as corresponding to foliage as in Example 16 by determining one or more of: the tracking age falling below an age threshold; the detection consistency falling below a consistency threshold; or the position variability exceeding a variability threshold.

In Example 18, classifying the feature of the one or more features as in any of Examples 16-17 includes classifying a first feature, wherein the instructions further cause the one or more processors to classify a second feature as corresponding to a solid object based on the tracking parameters.

In Example 19, the instructions cause the one or more processors to classify the second feature as corresponding to a solid object as in Example 18 based on one or more of: the tracking age exceeding an age threshold; the detection consistency exceeding a consistency threshold; or the position variability falling below a variability threshold.

In Example 20, the instructions cause the one or more processors to determine tracking parameters as in any of Examples 16-19 by determining one or more of: the tracking age, wherein the instructions cause the one or more processors to determine the tracking age for a specific feature by determining how long the specific feature has been tracked or detected; the detection consistency, wherein the instructions cause the one or more processors to determine the detection consistency for a specific feature by determining a percent or ratio of frames in which the feature has been detected within a time period; or the position variability, wherein the instructions cause the one or more processors to determine the position variability for a specific feature by determining a standard deviation for one or more of position and orientation of the specific feature.

Example 21 is a system or device that includes means for implementing a method, system, or device as in any of Examples 1-20.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium, which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer.

Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. The terms "modules" and "components" are used in the names of certain components to reflect their implementation independence in software, hardware, circuitry, sensors, or the like. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

The invention claimed is:

1. A method for detecting foliage, the method comprising:
   detecting and tracking one or more features within range data from one or more sensors;
   calculating tracking parameters for each of the one or more features, the tracking parameters comprising a tracking age and one or more of a detection consistency and a position variability; and
   classifying at least one feature of the one or more features as corresponding to foliage based on one or more of the tracking age falling below an age threshold, the detection consistency falling below a consistency threshold, or the position variability exceeding a variability threshold; and
   determining a driving maneuver for a vehicle based on the classification of the at least one feature and providing the driving maneuver to an automated driving/assistance system to be executed by the vehicle.

2. The method of claim 1, wherein classifying the feature of the one or more features comprises classifying a first feature, the method further comprising classifying a second feature as corresponding to a solid object based on the tracking parameters.

3. The method of claim 2, wherein classifying the second feature as corresponding to a solid object comprises classifying as corresponding to a solid object based on one or more of the tracking age exceeding an age threshold, the detection consistency exceeding a consistency threshold, or the position variability falling below a variability threshold.

4. The method of claim 1, wherein determining tracking parameters comprises determining the tracking age, wherein determining the tracking age for a specific feature comprises determining how long the specific feature has been tracked or detected.

5. The method of claim 1, wherein determining tracking parameters comprises determining the detection consistency, wherein determining the detection consistency for a specific feature comprises determining a percent or ratio of frames in which the feature has been detected within a time period.

6. The method of claim 1, wherein determining tracking parameters comprises determining the position variability, wherein determining the position variability for a specific feature comprises determining a standard deviation for one or more of position and orientation of the specific feature.

7. The method of claim 1, further comprising determining whether to avoid impacting an obstacle corresponding to the feature of the one or more features based on the classification of the feature.

8. The method of claim 1, wherein determining the driving maneuver for the vehicle based on the classification of the at least one feature comprises determining that a location corresponding to foliage is to be avoided with a lower priority than a solid object.

9. A system comprising:
a tracking component configured to detect and track one or more features within range data from one or more sensors;
a tracking parameters component configured to calculate tracking parameters for each of the one or more features, the tracking parameters comprising a tracking age and one or more of a detection consistency and a position variability; and
a classification component configured to classify at least one feature of the one or more features as corresponding to foliage based on one or more of the tracking age falling below an age threshold, the detection consistency falling below a consistency threshold, or the position variability exceeding a variability threshold; and
an obstacle avoidance component configured to determine a driving maneuver for a vehicle based on the classification of the at least one feature and provide the driving maneuver to an automated driving/assistance system to be executed by the vehicle.

10. The system of claim 9, wherein classifying the feature of the one or more features comprises classifying a first feature, wherein the classification component is further configured to classify a second feature as corresponding to a solid object based on the tracking parameters.

11. The system of claim 10, wherein the classification component is configured to classify the second feature as corresponding to a solid object based on one or more of:
the tracking age exceeding an age threshold;
the detection consistency exceeding a consistency threshold; or
the position variability falling below a variability threshold.

12. The system of claim 9, wherein the tracking parameters component is configured to determine tracking parameters comprising one or more of:
the tracking age, wherein the tracking parameters component is configured to determine the tracking age for a specific feature by determining how long the specific feature has been tracked or detected;
the detection consistency, wherein the tracking parameters component is configured to determine the detection consistency for a specific feature by determining a percent or ratio of frames in which the feature has been detected within a time period; or
the position variability, wherein the tracking parameters component is configured to determine the position variability for a specific feature by determining a standard deviation for one or more of position and orientation of the specific feature.

13. The method of claim 9, wherein the obstacle avoidance component is further configured to determine whether to avoid impacting an obstacle corresponding to the feature of the one or more features based on the classification of the feature.

14. Non-transitory computer readable storage media storing instructions that, when executed by one or more processors, cause the one or more processors to:
detect and track one or more features within range data from one or more sensors;
calculate tracking parameters for each of the one or more features, the tracking parameters comprising a tracking age and one or more of a detection consistency and a position variability; and
classify at least one feature of the one or more features as corresponding to foliage based on one or more of the tracking age falling below an age threshold, the detection consistency falling below a consistency threshold, or the position variability exceeding a variability threshold; and
determine a driving maneuver for a vehicle based on the classification of the at least one feature and providing the driving maneuver to an automated driving/assistance system to be executed by the vehicle.

15. The non-transitory computer readable storage media of claim 14, wherein classifying the feature of the one or more features comprises classifying a first feature, wherein the instructions further cause the one or more processors to classify a second feature as corresponding to a solid object based on the tracking parameters.

16. The non-transitory computer readable storage media of claim 15, wherein the instructions cause the one or more processors to classify the second feature as corresponding to a solid object based on one or more of:
the tracking age exceeding an age threshold;
the detection consistency exceeding a consistency threshold; or
the position variability falling below a variability threshold.

17. The non-transitory computer readable storage media of claim 14, wherein the instructions cause the one or more processors to determine tracking parameters by determining one or more of:
the tracking age, wherein the instructions cause the one or more processors to determine the tracking age for a specific feature by determining how long the specific feature has been tracked or detected;
the detection consistency, wherein the instructions cause the one or more processors to determine the detection consistency for a specific feature by determining a percent or ratio of frames in which the feature has been detected within a time period; or
the position variability, wherein the instructions cause the one or more processors to determine the position variability for a specific feature by determining a standard deviation for one or more of position and orientation of the specific feature.

* * * * *